United States Patent [19]
Gula et al.

[11] Patent Number: 6,153,367
[45] Date of Patent: Nov. 28, 2000

[54] BIAXIALLY ORIENTED POLYOLEFIN PAPERLESS IMAGING MATERIAL

[75] Inventors: Thaddeus S. Gula, Rochester; Robert P. Bourdelais; Pang-Chia Lu, both of Pittsford; Peter T. Aylward, Hilton, all of N.Y.

[73] Assignee: Eastman Kodak Company, Rochester, N.Y.

[21] Appl. No.: 09/178,703

[22] Filed: Oct. 26, 1998

[51] Int. Cl.[7] .............................. G03C 1/765; G03C 1/795
[52] U.S. Cl. .......................... 430/496; 430/510; 430/536; 430/939; 430/950; 428/315.7; 428/315.9; 347/106
[58] Field of Search ...................... 430/536, 950, 430/510, 939, 496; 428/315.7, 315.9; 347/106

[56] References Cited

U.S. PATENT DOCUMENTS

| | | | |
|---|---|---|---|
| 4,187,113 | 2/1980 | Mathews et al. | 430/533 |
| 4,255,516 | 3/1981 | Katoh et al. | 430/533 |
| 4,368,295 | 1/1983 | Newton et al. | 525/166 |
| 4,701,370 | 10/1987 | Park | 428/314.4 |
| 4,912,333 | 3/1990 | Roberts et al. | 250/487.1 |
| 4,994,312 | 2/1991 | Maier et al. | 428/36.5 |
| 5,055,371 | 10/1991 | Lee et al. | 430/126 |
| 5,387,501 | 2/1995 | Yajima et al. | 430/533 |
| 5,389,422 | 2/1995 | Okazaki et al. | 428/141 |
| 5,466,519 | 11/1995 | Shirakura et al. | 428/323 |

*Primary Examiner*—Richard L. Schilling
*Attorney, Agent, or Firm*—Paul A. Leipold

[57] ABSTRACT

The invention relates to an imaging element comprising a base consisting of an integral biaxially oriented polyolefin polymer sheet having an upper surface that binds to gelatin, a lower surface that has a matte surface, a stiffness of at least 120 millinewtons, and a thickness of greater than 160 mm.

17 Claims, No Drawings

BIAXIALLY ORIENTED POLYOLEFIN PAPERLESS IMAGING MATERIAL

FIELD OF THE INVENTION

This invention relates to photographic materials. In a preferred form it relates to base materials for replacing photographic color papers.

BACKGROUND OF THE INVENTION

In the formation of color paper for photographs, ink jet images or digital images, it is known that the base paper has applied thereto a layer of polymer, typically polyethylene. This layer serves to provide waterproofing to the paper, as well as providing a smooth surface on which the imaging layers are formed. The formation of a suitably smooth surface is difficult requiring great care and expense to ensure proper laydown and cooling of the polyethylene layers. One defect in prior formation techniques is caused when an air bubble is trapped between the forming roller and the polyethylene which will form the surface for casting of photosensitive materials. This air bubble will form a pit that will cause a defect in the photographic performance of photographic materials formed on the polyethylene. It would be desirable if a more reliable and improved surface could be formed at less expense.

In color papers there is a need for providing color papers with improved resistance to curl. Present color papers will curl during development and storage. Such curl is thought to be caused by the different properties of the layers of the color paper as it is subjected to the developing and drying processes. This is especially true when the paper at the middle of a photographic element gains or loses water and pushes against stiffer plastic moisture insensitive layers bonded to the outside the paper. There are particular problems with color papers when they are subjected to extended high humidity storage such as at greater than 50% relative humidity. Extremely low humidity of less than 20% relative humidity also will cause photographic papers to curl. It would be desireable to provide a totally plastic composite base to improve internal stress differences that result in curl.

In photographic papers the polyethylene layer also serves as a carrier layer for titanium dioxide and other whitener materials as well as tint materials. It would be desirable if the colorant materials rather than being dispersed throughout the polyethylene layer could be concentrated nearer the surface of the layer where they would be more effective photographically.

While prior art photographic materials have been satisfactory, there is a need for images that can more closely replicate the actual scenes photographed.

One improvement would be sharpness, or the ability to replicate fine details of the image. This can be measured by mathematical calculations, one such method is called the MTF or Modulation Transfer Function. In this test, a fine repeating sinusoidal pattern of photographic density variation near the resolution of the human eye is exposed on a photographic print, when the print is developed the resulting density variation is compared to the expected density and a ratio is obtained to determine the magnitude of the transfer coefficient at that frequency. A number of 100 denotes perfect replication, and this number is relatively easy to obtain at spatial frequencies of 0.2 cycle/mm. At a finer spacing of 2.0 cycles/mm typical color photographic prints have a 70 rating or 70% replication.

Another improvement desired would be the visual appearance of whiteness in exposed subject areas like snow or a wedding gown. Because of imperfect light reflection from the surface underneath the image bearing emulsion, the current photographic prints tend to look yellow, and if corrections to the surface underneath the emulsion are made, then they may appear more gray or blue which is desired for some products. The measurement for this problem is a DMIN value which is a measurement of the photographic minimum density attained on a specially exposed print. In practice, it has been found that the surface under the silver halide layer can be measured to predict DMIN by using the L Star UVO value. The L Star UVO (ultraviolet filter out) can be obtained from a HUNTER spectrophotometer, CIE system, using procedure D65.

Improvements in another optical property affected by the base paper is opacity, or the ability of the photographic element to hide any visual evidence of what is behind the print. For example, the logo printed on the back, or the outline of the shadow of the fingers holding the print. Opacity numbers are generated by taking the ratio of the light reflected from the viewing surface of a generally white image when it is backed by a white background and then backed by a black background. A ratio of 1, which is reported as 100, is perfect. Most photographic materials today are rated at 92 to 95.

To improve optical properties, prior art photographic materials have suggested monolayer or coextruded layer coatings on raw paper base that are thicker and/or more concentrated with titanium dioxide ($TiO_2$) and colorants.

Other high refractive index materials like zinc oxide or other finely divided solids are also used. In general, these improvements are costly. Processing and coating these concentrated layers can create manufacturing problems such as specks, lines and surface disruptions. The highly pigmented layers deteriorate the strength property of the coatings and may be involved with poor adhesion to the base paper or to the image bearing emulsion layer. Also, the coating speed of these layers may be lower. It would be particularly desirable if there was a way to produce improvements in MTF, LSTAR, and OPACITY at the same time without using levels of pigment loading that can cause manufacturing problems.

Another improvement would be to remove the need to maintain exact and even moisture profiles in the paper portion of imaging elements. During a critical hardening stage after emulsion coating, the interleaved layers of emulsion, plastic, and paper, wound in roll form, undergo a moisture exchange which affects the rate of the beneficial hardening chemical reaction. This exchange can be eliminated with an all plastic base, and as a result easier and cheaper methods for hardening can be used. This technology is well known and developed for use in the production of movie films, amatuer and professional film negatives, and x-ray products, all of which are coated with emulsion on totally plastic bases. It would be desirable if a suitable replacement for cellulose paper could be found for reflective imaging supports.

The assembly process of creating the photographic base materials is now at least a two step coating operation, the fiber paper base is made and then transferred to an extrusion machine for application of the plastic layers. The machine that produces the raw paper base is specialized for this purpose and often does not efficiently run the same speed and width as an extrusion laminating machine. It would be desireable to combine both operations into one cost effective, efficient, high, speed coating machine with less inventory.

It has been proposed in International Application Numbers PCT/US95/11222 and PCT/CA93/00385 to provide a paper like film comprising no paper fiber as a base that reproduces the feel and texture of paper in composite sheets. European Patent Application number 91307049.6 discloses a voided, coextruded, all plastic system that contains white pigments, antistat, and a paper-like printable surface that might be used as a paper replacement in photographic systems. As written, the applications all require more layers to be added before the composite imaging members are suitable for a base to be coated with photographic quality gelatin based emulsions.

It has been proposed in U.S. Pat. No. 5,244,861 to utilize biaxially oriented polypropylene in receiver sheets for thermal dye transfer.

PROBLEM TO BE SOLVED BY THE INVENTION

There remains a need for a more effective layer between the photosensitive layers and the base paper to more effectively carry colorant materials so that we may create major improvements in all three optical performance properties (MTF, LSTAR, and OPACITY) that are practical, manufacturable, and cost effective.

There remains a need to provide a photographic quality base material that improves curling properties and simplifies the emulsion hardening reaction.

There remains a need for a single composite layer that can replace the separately coated paper and plastic layers used today and that has all the necessary properties for a base to be coated with photographic quality gelatin based emulsions.

SUMMARY OF THE INVENTION

An object of the invention is to provide improved photographic papers.

It is an object of the invention to provide photographic images that have improved image reproduction.

It is another object of the invention to reduce the amount of pigments or tinting agents used in the prior art.

It is another object of the invention to provide photographic elements that can be more easily manufactured with reduced defect levels.

It is another object of the invention to provide photographic elements that can be coated at very high speed.

It is another object of the invention to provide coatings that allow more effective recycling.

These and other objects of the invention are accomplished by an imaging element comprising a base consisting of an integral biaxially oriented polyolefin polymer sheet having an upper surface that binds to gelatin, a lower surface that has a matte surface, a bending stiffness of at least 120 millinewtons, and a thickness of greater than 160 µm.

ADVANTAGEOUS EFFECT OF THE INVENTION

The invention provides an improved base for casting of photosensitive layers. It particularly provides improved base for color photographic materials that have improved images, require less equipment for formation, fewer coating operations for formation, less inventory, and better quality.

DETAILED DESCRIPTION OF THE INVENTION

There are numerous advantages of the invention over prior practices in the art. The invention provides a photographic element or imaging element that has much less tendency to curl when exposed to extremes of humidity. Further, the invention provides a photographic print element that is much lower in cost as the criticalities of the formation of the polyethylene are removed. There is no need for the difficult and expensive melt extrusion casting and cooling in forming a surface on the polyethylene layer as the biaxially oriented polymer sheet of the invention provides a high quality surface for casting of photosensitive layers. Photographic materials utilizing microvoided sheets of the invention have improved resistance to tearing. The photographic materials of the invention are lower in cost to produce as the imaging support is manufactured in a single operation compared to the current two step operation. With present polyethylene layers the quality of the layer cannot be assessed until after complete formation of the base paper with the polyethylene waterproofing layer attached. Therefore, any defects result in expensive discard of expensive manufactured product. The invention allows faster hardening of photographic emulsion, as water vapor is not transmitted from the emulsion through the biaxially oriented sheet base.

Another advantage of the microvoided sheets of the invention is that they can be more opaque than titanium dioxide loaded polyethylene of present products. They achieve this opacity partly by the use of the voids in the composite structure. The photographic elements of this invention are more scratch resistant as the oriented polymer sheet on the back of the photographic element resists scratching and other damage more readily than polyethylene. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image.

Any suitable biaxially oriented polyolefin sheet may be used for the base of the invention. Microvoided biaxially oriented sheets are preferred and are conveniently manufactured by coextrusion of the core and surface layers, followed by biaxial orientation, whereby voids are formed around void-initiating material contained in the core layer.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

The percent solid density should be between 45% and 100%, preferably between 80% and 100%. As the percent solid density becomes less than 67%, the composite sheet becomes less manufacturable due to a drop in tensile strength and it becomes more susceptible to physical damage such as stress fracturing of the skin layer which will reduce the commercial value of an image.

The thickness of each of the voided core layers is preferably between 10 and 60 µm. Manufacturing a voided layer less than 10 µm is very difficult. Above 60 µm, the structure becomes more susceptible to physical damage caused by stresses encountered when the photographic element is bent. Such stresses are encountered when photographic images are viewed and handled by the consumer.

The thickness of the upper layer (the layer between the photosensitive layer and the voided layer) is preferably between 1 and 15 µm. Below 1 µm in thickness, the micro voided sheet becomes difficult to manufacture as the limits of a biaxially oriented layer are reached. Above 15 µm, little improvement is seen in the optical performance of the layer. The thickness of the layer adjacent and below the microvoided layer is preferably between 2 and 15 µm. For the same reasons manufacturing outside this range can either cause manufacturing problems or does not improve the optical performance of the photographic support.

The total thickness of the composite sheet can range from 160 to 320 µm, preferably from 190 to 230 µm. Below 160 µm, the sheets may not be thick enough to provide acceptable "tactile feel" to the customer. Above, 330 µm, the sheets are very hard to process through photo finishing equipment where the punching, slitting, and chopping of supply rolls into smaller prints is very difficult. Tactile feel has been found to be related to a combination of caliper (thickness) and stiffness. Consumers have traditionally associated acceptable tactile feel with prior art photographic prints. A typical range of acceptable combinations of Young's Modulus of the entire sheet and caliper is shown in Table I below.

TABLE 1

| Young's Modulus, Mpa | Required Minimum Caliper, µm | Required Maximum Caliper, µm |
|---|---|---|
| 689 | 328 | 330 |
| 1379 | 260 | 330 |
| 2068 | 227 | 330 |
| 2758 | 207 | 330 |
| 3447 | 192 | 320 |
| 4137 | 181 | 301 |
| 4826 | 172 | 286 |
| 5516 | 164 | 273 |

The bending stiffness of the sheet can be measured by using the LORENTZEN & WETTTRE STIFFNESS TESTER, MODEL 16D. The output from this instrument is the force, in millinewtons, required to bend the cantilevered, unclamped end of a clamped sample 20 mm long and 38.1 mm wide at an angle of 15 degrees from the unloaded position. A typical range of stiffness that is suitable for photographic prints is 120 to 300 millinewtons. The ranges of the design variables in Table 1 are chosen to be provide sheets in this stiffness range. A stiffness greater than at least 120 millinewtons is required as the imaging support begins to loose commercial value below that number. Further, imaging supports with stiffness less than 120 millinewtons are difficult to transport in photofinishing equipment or ink jet printers causing undesirable jams during transport.

"Void" is used herein to mean devoid of added solid and liquid matter, although it is likely the "voids" contain gas. The void-initiating particles which remain in the finished packaging sheet core should be from 0.1 to 10 µm in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with a agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet, suitable classes of thermoplastic polymers of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene and polyethylene are preferred, because they are low in cost and have desirable strength properties. Further, current light sensitive silver halide coatings have been optimized to adhere to polyethylene.

The nonvoided skin layers of the composite sheet can be made of the same polymeric materials as listed above for the voided core matrix. The composite sheet can be made with skin(s) of the same polymeric material as the core matrix, or it can be made with skin(s) of different polymeric composition than the core matrix.

Addenda may be added to the core matrix and/or to the skins to improve the optical properties of the photographic support. Titanium dioxide is preferred and is used in this invention to improve image sharpness or MTF, opacity and whiteness. The $TiO_2$ used may be either anatase or rutile type. In the case of whiteness, anatase is the preferred type. In the case of sharpness, rutile is the preferred. Further, both anatase and rutile $TiO_2$ may be blended to improve both whiteness and sharpness. Examples of $TiO_2$ that are acceptable for a photographic system are Dupont Chemical Co. R101 rutile $TiO_2$ and DuPont Chemical Co. R104 rutile $TiO_2$. Other pigments known in the art to improve photographic optical responses may also be used in this invention. Preferred pigments are talc, kaolin, $CaCO_3$, $BaSO_4$, ZnO, $TiO_2$, ZnS, and $MgCO_3$.

The preferred weight percent of white pigment to be added to the biaxially oriented layers between the photosensitive layer and the voided layer can range from 4% and 24% by weight, preferably from 15% to 20% of the weight of the polymer in that layer. Below 15% the optical properties of the voided biaxially oriented sheet do not show a significant improvement over prior art photographic paper. Above 20%, manufacturing problems such as unwanted voiding and a loss of coating speed are encountered. The voided layer may also contain white pigments. The voided layer may contain between 2 and 18% white pigment based on the weight of the polymer in that layer, preferably between 2% and 8%. Below 2%, the optical properties of the voided biaxially oriented sheet do not show a significant improvement. Above 8%, the voided layer suffers from a loss in mechanical strength which will reduce the commercial value of the photographic support of this invention as images are handled and viewed by consumers.

The layer adjacent and below the voided layer may also contain white pigments of this invention. The addition of white pigments to this layer has been found to increase the opacity of the sheet of this invention. High sheet opacity decreases the amount of transmitted light when prints are viewed by consumers.

The total thickness of the top most skin layer should be between 0.20 $\mu$m and 1.5 $\mu$m, preferably between 0.5 and 1.0 $\mu$m. Below 0.5 $\mu$m any inherent non-planarity in the coextruded skin layer may result in unacceptable color variation. At skin thickness greater than 1.5 atm, there is a reduction in the photographic optical properties such as image resolution. At thickness greater than 1.5 $\mu$m there is also a greater material volume to filter for contamination such as clumps or poor color pigment dispersion.

Addenda may be added to the top most skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet it can cause numerous manufacturing problems such as extrusion die lines and spots. The skin layer substantially free of $TiO_2$ is preferred. $TiO_2$ added to a layer between 0.20 and 1.5 $\mu$m does not substantially improve the optical properties of the support, will add cost to the design and will cause objectionable pigments lines in the extrusion process.

Additional addenda may be added to the core matrix and/or to the skins to improve the optical properties such as image sharpness, opacity and whiteness of these sheets. This would also include adding fluorescing agents which absorb energy in the UV region and emit light largely in the blue region, or other additives which would improve the physical properties of the sheet or the manufacturability of the sheet.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. Biaxially oriented sheets could be formed with surface layers that would provide an improved adhesion the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The bottom layers of the polymer sheet, opposite to the emulsion side layers, may be any suitable polymer. The layer(s) may or may not be microvoided. It may have the same composition as the layer on the topside of the composite material.

The preferred thickness of the bottom biaxially oriented layer should be from 10 to 150 $\mu$m. Below 7 $\mu$m, the layer may not be thick enough to balance the layers on the opposite side. Above 170 $\mu$m, little improvement in surface roughness and mechanical properties are observed.

Suitable classes of thermoplastic polymers for the biaxially oriented backside layers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The preferred bottom biaxially oriented layer is a biaxially oriented mixture of polyethylene and a terpolymer of ethylene, propylene and butylene. This mixture is perferred because it provides the required backside roughness to allow efficient transport in photofinishing equipment.

Addenda may be added to the biaxially oriented bottom layer to improve the whiteness of these structures. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the layer.

The biaxially oriented layer on the backside of the composite sheet, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

The biaxially oriented layer on the back side of the composite sheet should have a surface roughness average, $R_a$, of greater than 0.30 $\mu$m. This is commonly referred to as a "matte" surface. The roughness average can be measured by a TAYLOR-HOBSON Surtronic 3 with a 2 $\mu$m diameter ball tip, and a built in cutoff filter to reject the signal from spatial frequencies larger than 0.25 mm. Photographic elements with a back side $R_a$ less than 0.30 $\mu$m cannot be efficiently transported in photoprocessing equipment where problems such as scratching, machine jams, and poor print stacking may occur. Also, a minimum roughness is needed to prevent sticking of the back side to the smooth image layer of the front side. Also, photographic elements that are too smooth are hard to write on when consumers wish to record personal information on the backside with pencils or pens.

These biaxially oriented layers may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma, or corona discharge treatment to improve printability or adhesion.

The biaxially core may also comprise a microvoided polyethylene terephalate such as disclosed in U.S. Pat. Nos. 4,912,333; 4,994,312; and 5,055,371.

The structure of a preferred biaxially oriented, microvoided imaging support sheet of the invention is as follows where the imaging layer would be coated on the polyethylene skin:
Polyethylene containing blue pigments
Polypropylene containing $TiO_2$
Polyproplyene micro voided core
Polypropylene
Mixture of polyethylene and a terpolymer of ethylene-propylene-butylene In one preferred embodiment, in order to produce photographic elements, the composite support sheet is coated with a photographic element or elements.

As used herein the phrase "imaging element" is a material that may be used as a laminated support for the transfer of images to the support by techniques such as ink jet printing or thermal dye transfer as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyvinyl alcohol, polycarbonate, polyvinyl pyrrolidone, starch and methacrylate.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process,* Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 Al (Yamashita), EP 0 369 491 (Yamashita), EP 0 371 388 (Ohashi), EP 0 396 424 Al (Takada), EP 0 404 142 Al (Yamada), and EP 0 435 355 Al (Makino).

The photographic elements of this invention may use emulsions doped with Group VII metals such as iridium, rhodium, osmium, and iron as described in *Research*

Disclosure, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm.

The invention may be utilized with the materials disclosed in Research Disclosure, September 1997, Item 40145. The invention is particularly suitable for use with the material color paper examples of sections XVI and XVII. The couplers of section II are also particularly suitable. The Magenta I couplers of section II, particularly M-7, M-10, M-18, and M-18, set forth below are particularly desirable.

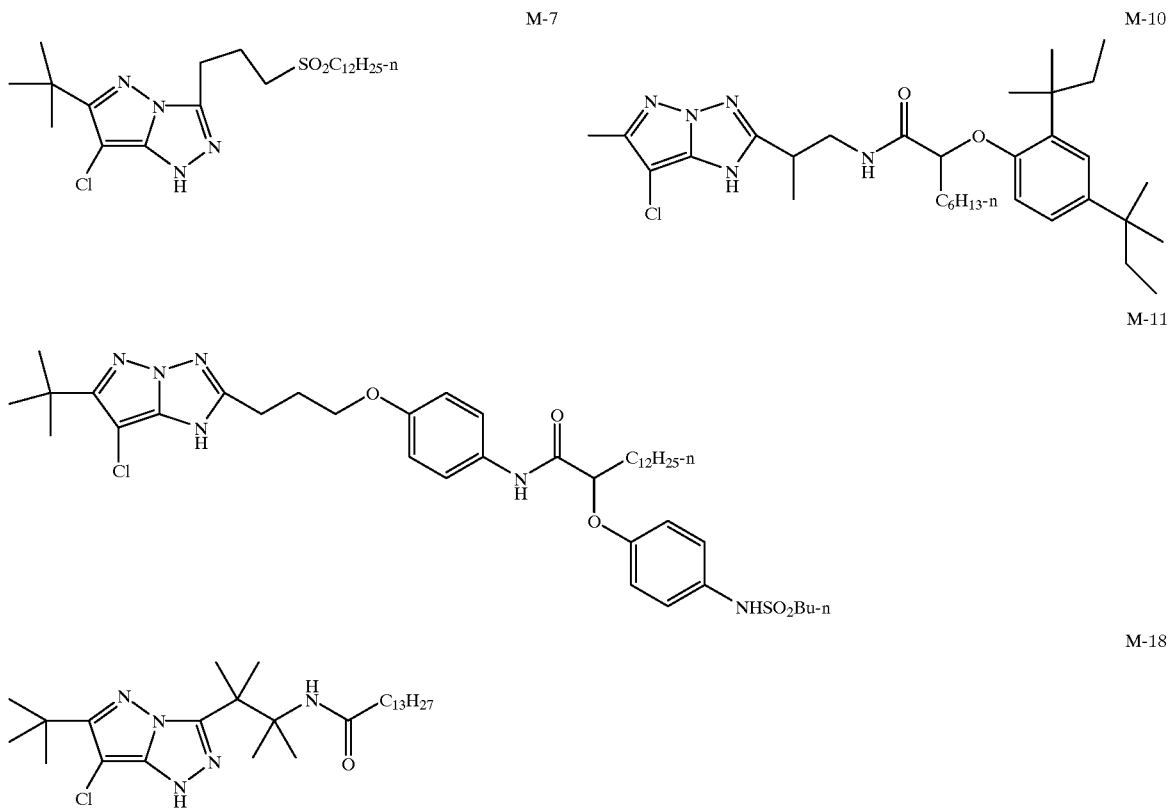

In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
| | I, II, III, IX | hardeners, coating aids, |

| Reference | Section | Subject Matter |
|---|---|---|
| 3 | A & B | addenda, etc. |
| 1 | III, IV | Chemical sensitization and |
| 2 | III, IV | spectral sensitization/ |
| 3 | IV, V | Desensitization. |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| I | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLE

Coating format 1 below can be utilized to coat samples of a photographic element of the invention with a silver halide emulsion.

| | Coating Format 1 | Laydown mg/m$^2$ |
|---|---|---|
| Layer 1 | Blue Sensitive Layer | |
| | Gelatin | 1300 |
| | Blue sensitive silver | 200 |
| | Y-1 | 440 |
| | ST-1 | 440 |
| | S-1 | 190 |
| Layer 2 | Interlayer | |
| | Gelatin | 650 |
| | SC-1 | 55 |
| | S-1 | 160 |
| Layer 3 | Green Sensitive | |
| | Gelatin | 1100 |
| | Green sensitive silver | 70 |
| | M-1 | 270 |
| | S-1 | 75 |
| | S-2 | 32 |
| | ST-2 | 20 |
| | ST-3 | 165 |
| | ST-4 | 530 |
| Layer 4 | UV interlayer | |
| | Gelatin | 635 |
| | UV-1 | 30 |
| | UV-2 | 160 |
| | SC-1 | 50 |
| | S-3 | 30 |
| | S-1 | 30 |
| Layer 5 | Red Sensitive Layer | |
| | Gelatin | 1200 |
| | Red sensitive silver | 170 |
| | C-1 | 365 |
| | S-1 | 360 |
| | UV-2 | 235 |
| | S-4 | 30 |
| | SC-1 | 3 |
| Layer 6 | UV Overcoat | |
| | Gelatin | 440 |
| | UV-1 | 20 |
| | UV-2 | 110 |
| | SC-1 | 30 |
| | S-3 | 20 |
| | S-1 | 20 |
| Layer 7 | SOC | |
| | Gelatin | 490 |
| | SC-1 | 17 |
| | SiO$_2$ | 200 |
| | Surfactant | 2 |

APPENDIX

Y-1

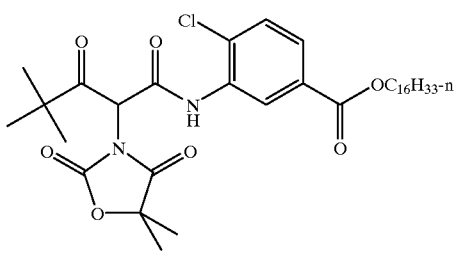

ST-1 = N-tert-butylacrylamide/n-butyl acrylate copolymer (50:50)

S-1 = dibutyl phtalate

SC-1
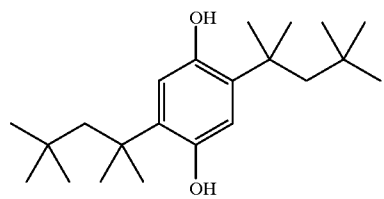

M-1
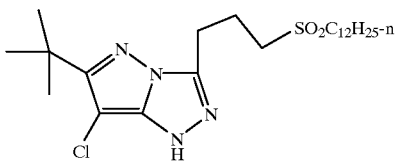

S-2 = diundecyl phthalate

ST-2
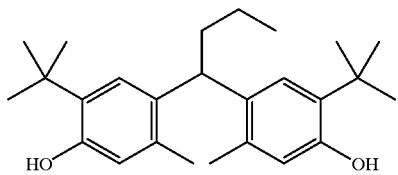

ST-3
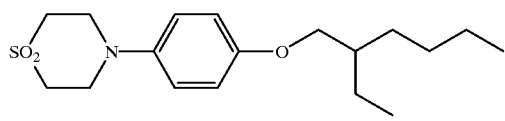

ST-4
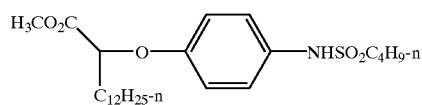

UV-1
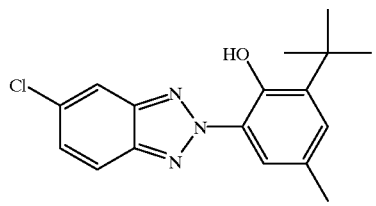

UV-2
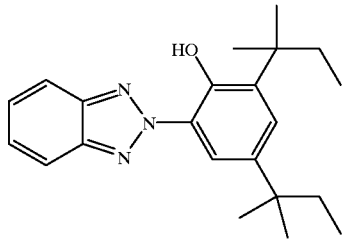

S-3 = 1,4-Cyclohexyldimethylene bis(2-ethylhexanoate)

C-1
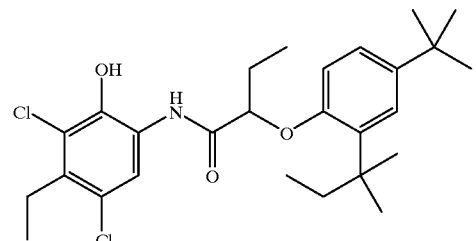

S-4 = 2-(2-Butoxyethoxy)ethyl acetate

Dye 1
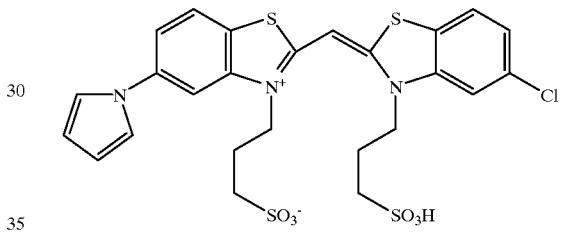

Coating Format 1 is applied to the layer "a" of the support sheet of Table 2 below

TABLE 2

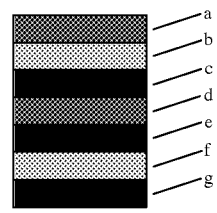

TABLE 3

| Label of layer in Table 2 | Layer materials | Primary layer function | Layer thickness, μm |
|---|---|---|---|
| a | Polyethylene, 2.5 mg/m² NPIRI Raw Materials Data Handbook Pigment Blue 60 | Adhesion to gelatine, color correction | 1.27 |
| b | Polypropylene, 18% by wt. TiO₂ | Opacity, whiteness, sharpness | 11.4 |
| c | Polypropylene, Void initiators | Opacity, sharpness and whiteness accelerator | 25.4 |
| d | Polypropylene | Control of bending stiffness | 102 |
| e | Polypropylene, Void Initiators | Opacity, sharpness and whiteness accelerator | 25.4 |

TABLE 3-continued

| Label of layer in Table 2 | Layer materials | Primary layer function | Layer thickness, μm |
|---|---|---|---|
| f | Polypropylene, 18% by wt. TiO$_2$ | Opacity, whiteness | 11.4 |
| g | Polymer blend of polyethylene and a terpolymer of ethylene, propylene and butylene | 0.584 μm surface roughness average with spatial frequencies less than 0.25 mm | 1.0 |

The structure of the example above exhibits all the properties needed for an imaging support that replaces current designs of reflective imaging supports that contain photographic grade cellulose paper. The voided or non-voided layers have levels of TiO$_2$ and colorants adjusted to provide optimum optical properties for control of MTF, LSTAR, and OPACITY. The layer thickness and strength properties are chosen to provide the performance and feel of typical paper based photographic paper which is preferred by consumers. The matte backside has roughness properties to provide efficient photofinishing, stacking, and writabilty. Further, this imaging support, because it does not contain cellulose paper fiber, avoids the many problems associated with cellulose paper. Problems such as undesirable image curl, dusting during photofinishing and slitting, paper yellowing and undesirable edge penetration. Finally the imaging element with the invention support would be lower in cost over prior art materials as the imaging support of this invention can be manufactured in a single operation compared to the multiple manufacturing steps that are required with reflective imaging supports containing paper.

The invention has been described in detail with particular reference to preferred embodiments thereof, but it will be understood that variations and modifications can be effected within the spirit and scope of the invention.

What is claimed is:

1. An imaging element comprising a base consisting of an integral biaxially oriented polyolefin polymer sheet having an upper surface layer that binds to gelatin, a lower surface layer that has a matte surface, a stiffness of at least 120 millinewtons, a thickness of greater than 160 μm and further comprising at least one solid polymer core layer.

2. The imaging element of claim 1 further comprising at least one layer comprising colorant.

3. The imaging element of claim 1 further comprising colorant in the top layer.

4. The imaging element of claim 1 further comprising titanium dioxide in a layer adjacent to at least one surface layer.

5. The imaging element of claim 1 further comprising voided layers adjacent the top and bottom of said at least one solid polymer core layer.

6. The imaging element of claim 1 wherein said lower surface layer has a roughness average, R$_a$, of greater than 0.30 μm when measured with a cutoff filter to reject the signal from spatial frequencies larger than 0.25 mm.

7. The imaging element of claim 1 wherein said thickness is between 250 and 350 μm.

8. The imaging element of claim 1 wherein said bending stiffness is between about 150 and 300 millinewtons.

9. A photographic element comprising at least one photosensitive layer on an integral polymer sheet comprising a top layer of polyethylene and colorant, adjacent said top layer an opacifying layer of polypropylene comprising white pigment, below said opacifying layer an upper voided layer, below said upper voided layer at least one solid polymer layer, below said solid polymer layer a lower voided layer, below said lower voided layer a lower opacifying layer and on the lower surface a layer having a matte surface.

10. The photographic element of claim 9 wherein said upper and voided layers are each substantially the same thickness and have a thickness of between 10 to 50 μm.

11. The photographic element of claim 9 wherein said solid polymer layer has a thickness of between about 50 and 200 μm.

12. The photographic element of claim 9 wherein said upper and lower opacifying layers each have a thickness between 5 and 25 μm.

13. The photographic element of claim 9 wherein said top layer of polyethylene has a thickness of between about 0.5 and 5 μm and said colorant comprises blue pigment.

14. The photographic element of claim 9 wherein the layers of said integral polymer sheet other than the top layer comprise polypropylene.

15. The photographic element of claim 9 wherein a gelatin layer is in contact with said top polyethylene layer.

16. An imaging element comprising a base consisting of an integral biaxially oriented polyolefin polymer sheet having an upper surface layer that binds to gelatin, a lower surface layer that has a matte surface, a stiffness of at least 120 millinewtons, a thickness of greater than 160 μm, and further comprising titanium dioxide adjacent to at least one surface layer.

17. The imaging element of claim 16 further comprising voided layers adjacent the top and bottom of a solid polymer core layer.

* * * * *